US010185712B2

United States Patent
Gidney (10) Patent No.: US 10,185,712 B2
(45) Date of Patent: *Jan. 22, 2019

(54) STANDARD EXACT CLAUSE DETECTION

(71) Applicant: Seal Software Ltd., Godalming (GB)

(72) Inventor: Kevin Gidney, Oslo (NO)

(73) Assignee: Seal Software Ltd., Godalming, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,023

(22) Filed: Oct. 2, 2017

(65) Prior Publication Data

US 2018/0024992 A1    Jan. 25, 2018

Related U.S. Application Data

(63) Continuation of application No. 14/797,959, filed on Jul. 13, 2015, now Pat. No. 9,805,025.

(51) Int. Cl.
  *G06F 17/27*    (2006.01)

(52) U.S. Cl.
  CPC ...... *G06F 17/2785* (2013.01); *G06F 17/2705* (2013.01); *G06F 17/2775* (2013.01)

(58) Field of Classification Search
  CPC ............ G06F 17/2775; G06F 17/2785; G06F 17/2705; G06F 17/273; G06F 17/30011; G06F 3/0482; G06F 17/28; G06F 17/30604; G06F 17/30864; G06F 17/212; G06F 17/2247; G06F 17/275; G06F 17/278; G06F 17/30657; G06F 17/30654; G06F 17/30684; G06F 17/241; G06F 17/2795; G06F 17/30598; G06F 17/2241; G06F 17/24; G06F 17/272; G06F 17/2809; G06F 17/3002; G06F 17/30038; G10L 13/08
  See application file for complete search history.

(56) References Cited

U.S. PATENT DOCUMENTS

| | | |
|---|---|---|
| 3,662,400 A | 5/1972 | Geil |
| 5,577,241 A | 11/1996 | Spencer |
| 6,154,579 A | 11/2000 | Goldberg |
| 6,263,335 B1 | 7/2001 | Paik et al. |
| 6,295,529 B1 | 9/2001 | Corston Oliver et al. |
| 6,654,731 B1 | 11/2003 | Mahesh |
| 6,675,170 B1 | 1/2004 | Flake |
| 7,171,415 B2 | 1/2007 | Kan et al. |

(Continued)

OTHER PUBLICATIONS

United States Office Action, U.S. Appl. No. 14/797,959, dated Jan. 9, 2017, 14 pages.

*Primary Examiner* — Abdelali Serrou
(74) *Attorney, Agent, or Firm* — Fenwick & West LLP (57) ABSTRACT

Embodiments relate to a system and a method for identifying, from contractual documents, (i) standard exact clauses matching clause examples and (ii) non-standard clauses semantically related to but not matching the clause examples. A standard feature data set comprising standard exact clauses matching clause examples is obtained. In addition, a mirror feature data set comprising semantically related clauses of the clause examples is obtained using semantic language analysis, where the mirror feature data set encompasses the standard feature data set. Non-standard clauses are obtained by extracting a difference between the mirror feature data set and the standard exact feature data set.

18 Claims, 7 Drawing Sheets

(56) References Cited

U.S. PATENT DOCUMENTS

| | | |
|---|---|---|
| 7,853,472 B2 | 12/2010 | Al-Abdulqader et al. |
| 7,885,981 B2 | 2/2011 | Kaufman et al. |
| 8,001,144 B2 * | 8/2011 | Novak ............... G06F 17/30731 704/9 |
| 8,024,173 B1 | 9/2011 | Kinder |
| 8,249,856 B2 | 8/2012 | Shen et al. |
| 8,335,754 B2 | 12/2012 | Dawson et al. |
| 8,346,752 B2 | 1/2013 | Sirota et al. |
| 8,346,795 B2 | 1/2013 | Roulland et al. |
| 8,359,191 B2 | 1/2013 | Chen et al. |
| 8,781,815 B1 * | 7/2014 | Gidney ............... G06F 17/2785 704/1 |
| 8,818,793 B1 * | 8/2014 | Bangalore ............. G06F 17/271 704/1 |
| 8,849,648 B1 * | 9/2014 | Bangalore ........... G06F 17/2705 704/1 |
| 8,892,992 B2 * | 11/2014 | Mansfield ............. G06F 17/211 715/234 |
| 2001/0018698 A1 | 8/2001 | Uchino et al. |
| 2002/0053064 A1 | 5/2002 | Gupta et al. |
| 2002/0103818 A1 | 8/2002 | Amberden |
| 2003/0023539 A1 | 1/2003 | Wilce et al. |
| 2003/0046307 A1 | 3/2003 | Rivette et al. |
| 2003/0135520 A1 * | 7/2003 | Mitchell ........... G06F 17/30309 |
| 2003/0195885 A1 | 10/2003 | Emmick et al. |
| 2003/0204396 A1 | 10/2003 | Wakita et al. |
| 2004/0019578 A1 * | 1/2004 | Kalmes ............. G06F 17/30985 |
| 2004/0107088 A1 | 6/2004 | Budzinski |
| 2005/0060140 A1 | 3/2005 | Maddox |
| 2005/0108630 A1 * | 5/2005 | Wasson ................ G06F 17/241 715/230 |
| 2005/0182736 A1 | 8/2005 | Castellanos |
| 2005/0210040 A1 | 9/2005 | Beres et al. |
| 2006/0069545 A1 * | 3/2006 | Wu ..................... G06F 17/2264 704/8 |
| 2007/0174766 A1 | 7/2007 | Rubin et al. |
| 2008/0154873 A1 | 6/2008 | Redlich et al. |
| 2008/0168135 A1 * | 7/2008 | Redlich ................. G06Q 10/10 709/204 |
| 2008/0178076 A1 * | 7/2008 | Kritt .................... G06F 17/273 715/257 |
| 2008/0189249 A1 * | 8/2008 | Petakov ............. G06F 17/3087 |
| 2008/0306784 A1 * | 12/2008 | Rajkumar ............... G06F 17/21 705/342 |
| 2009/0076799 A1 | 3/2009 | Crouch et al. |
| 2009/0132235 A1 | 5/2009 | Liu |
| 2009/0132667 A1 | 5/2009 | Jung et al. |
| 2009/0157385 A1 | 6/2009 | Tian |
| 2009/0204596 A1 | 8/2009 | Brun et al. |
| 2009/0228777 A1 | 9/2009 | Henry et al. |
| 2009/0281931 A1 | 11/2009 | Axilrod et al. |
| 2010/0088338 A1 | 4/2010 | Pavoni et al. |
| 2011/0093771 A1 | 4/2011 | Gordon |
| 2011/0231414 A1 | 9/2011 | Goodwin et al. |
| 2012/0209876 A1 | 8/2012 | Thomas et al. |
| 2012/0266063 A1 | 10/2012 | Bushnell |
| 2013/0006611 A1 * | 1/2013 | Brdiczka ............. G06F 17/2705 704/9 |
| 2013/0006973 A1 | 1/2013 | Caldwell et al. |
| 2013/0007578 A1 | 1/2013 | Shreck et al. |
| 2013/0204877 A1 | 8/2013 | Boyle et al. |
| 2013/0311490 A1 * | 11/2013 | Mansfield ............. G06F 17/211 707/755 |
| 2013/0332164 A1 | 12/2013 | Nalk |
| 2014/0222415 A1 | 8/2014 | Legat |
| 2014/0337345 A1 | 11/2014 | Motoyama |
| 2015/0248881 A1 | 9/2015 | Holdren et al. |
| 2015/0324338 A1 * | 11/2015 | Levy ..................... G06F 17/211 715/244 |
| 2015/0347390 A1 | 12/2015 | Tewari et al. |

* cited by examiner

STANDARD EXACT CLAUSE DETECTION

CROSS-REFERENCE TO RELATED APPLICATIONS

This application is a continuation of U.S. application Ser. No. 14/797,959, filed Jul. 13, 2015, which is incorporated by reference in its entirety.

BACKGROUND

1. Field of Art

The disclosure generally relates to the field of natural language processing, and in particular, to identifying and extracting information from documents.

2. Description of the Related Art

A contract is a document that defines legally enforceable agreements between two or more parties. During the negotiation process, parties to the contract often agree to make multiple amendments or addendums, and these amendments or addendums can be stored in random formats in different locations.

Frequent changes in contracts often present challenges to conventional approaches for finding contracts and amendments, as conventional approaches typically focus on the unstructured text only and are not able to extract relevant and important information correctly. For example, a contract and amendments may include the clauses that contain wording such as "net 30 days," "within 30 days," "30 day's notice," and "2% penalty." On the other hand, one of the amendments may include the non-standard clauses such as "5 working days" with "60% penalty." Without the ability to discover the clauses and types of the clauses accounting for their semantic variations, any party not keeping track of the amendments or the addendums is vulnerable to a significant amount of risk of overlooking unusual contractual terminologies.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed configuration is a system (or a method or a non-transitory computer readable medium) for identifying standard exact clauses and non-standard clauses used in contractual documents. A standard exact clause herein refers to a clause including words and an order of words matching those of a predefined clause example. A non-standard clause herein refers to a clause semantically related to a predefined clause example, but including words or an order of words different from those of the predefined clause example. By identifying standard exact clauses and non-standard clauses from a corpus amount of contractual documents, exact clauses and semantically related clauses can be identified promptly to improve contract review process. It is noted that although described in a context of contracts, the principles described herein can apply to other structured documents.

In one embodiment, the system includes an input processor to configure raw input data into a format that can be structurally analyzed by a discovery engine. The discovery engine generates a predefined policy to be applied in a search engine. With the predefined policy, the discovery engine prepares initial search results to allow an administrator to select items to build and test a new custom policy along with all the predefined polices in a format that can be viewed by an end user. In the analysis engine, the end user can view the initial search results, and also customize the predefined policy to define a primary policy. With the primary policy, the analysis engine and the semantic language evaluator perform semantic language analysis, and first determine the standard clauses. Among the standard clauses, standard exact clauses with words and an order of the words exactly matching clause examples are identified. Furthermore, the analysis engine and the semantic language evaluator perform another semantic language analysis with a less restrictive secondary policy to extract the non-standard clauses.

Non-Standard and Standard Clause Detection System

Figure 1:
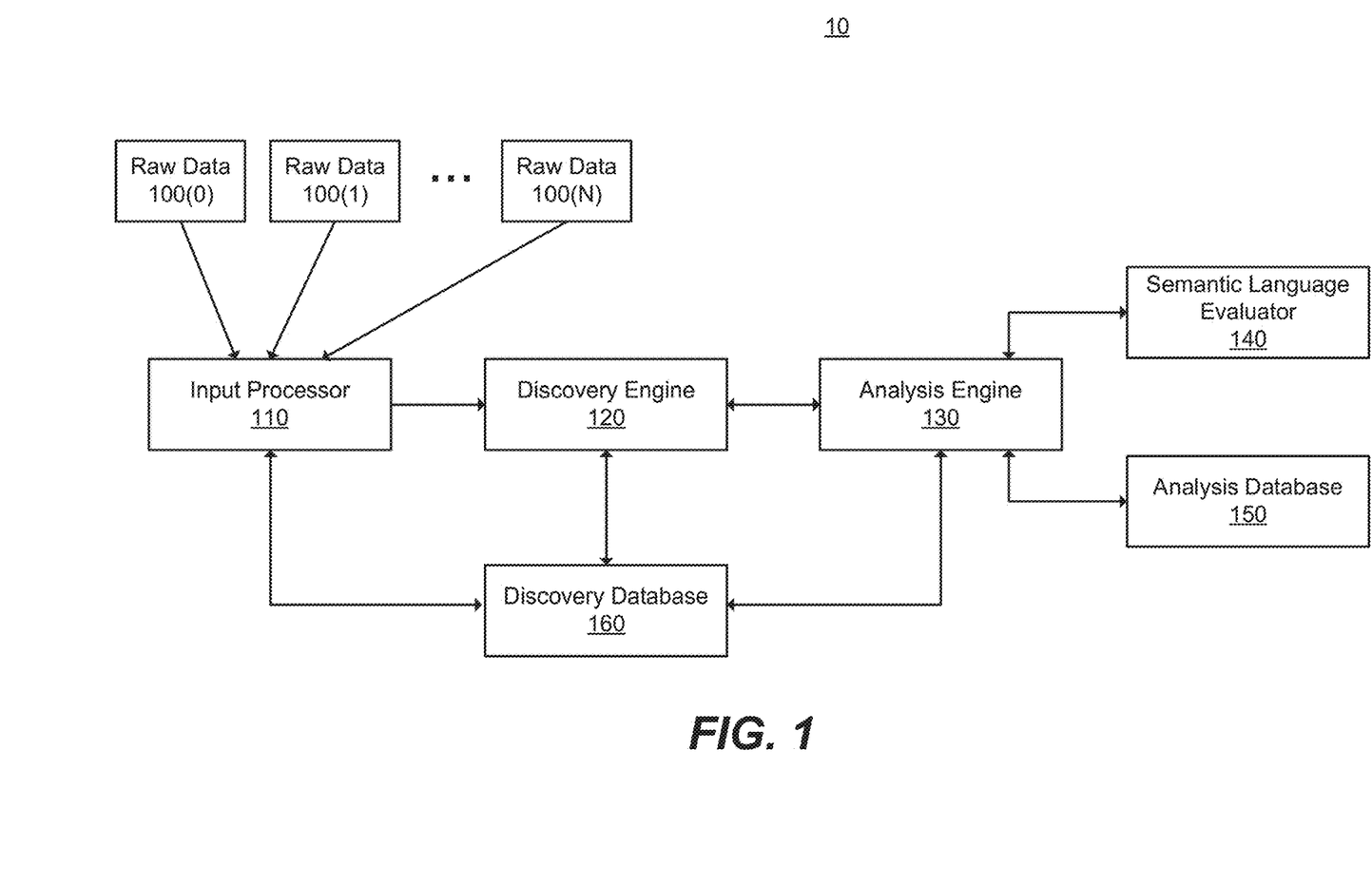
FIG. 1 illustrates one embodiment of a standard exact clause detection system for a contractual document.

FIG. 1 illustrates one exemplary embodiment of a standard exact clause detection system 10 including one or more input processors (generally an input processor 110), a discovery engine 120, an analysis engine 130, a semantic language evaluator 140, and an analysis database 150. Each of these components may be embodied as hardware, software, firmware or a combination thereof. In various embodiments, engines or modules include software (or firmware) structured to operate with processing components of a computing system to form a machine that operates as described herein for the corresponding engines or modules. Further, two or more engines may interoperate to form a machine that operates as described herein. Examples of the processing components of the computing system are described with respect to FIG. 8. The system 10 also comprises a discovery database 160 to store data for identifying standard exact clauses and non-standard clauses.

As illustrated in FIG. 1, the input processor 110 aggregates one or more raw data 100(0), 100(1) . . . 100(N) (generally 100) and processes them in an appropriate format. Also, the discovery engine 120 is communicatively coupled to the input processor 110. In addition, the analysis engine 130 is coupled to the discovery engine 120. The discovery engine 120 develops a predefined policy and initial search results. Additionally, the analysis engine 130 performs a semantic language analysis by applying policies to the semantic language evaluator 140, and determines the non-standard clauses, standard clauses, and standard exact clauses used in the raw data 100. Throughout the process the discovery database 160 stores the initial search results, metadata, and the predefined policy. In addition, the discovery database 160 is communicatively coupled to the input processor 110, the discovery engine 120, and the analysis engine 130. Additionally, the analysis engine 130 is coupled to the analysis database 150 and stores information for performing semantic language evaluation. In one embodiment, the discovery database 160 and the analysis database 150 can be combined into one database.

Figure 2:
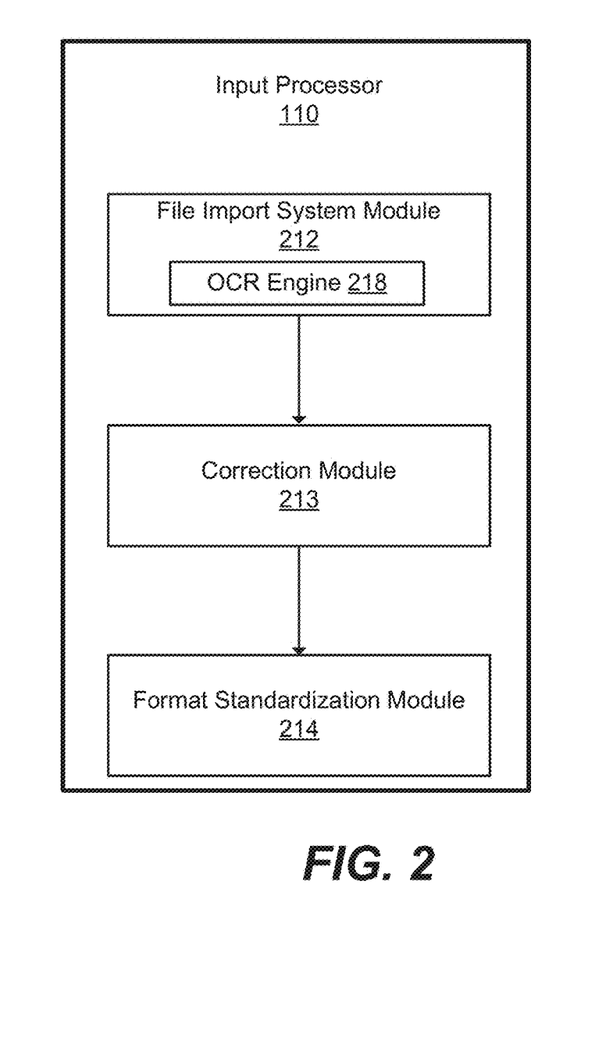
FIG. 2 illustrates an input processor of the standard exact clause detection system configured to process input data.

Turning to FIG. 2, it illustrates an exemplary embodiment of an input processor 110 that may aggregate the raw data 100, and refine them into acceptable formats in the following stages. As shown in FIG. 2, the input processor 110 includes a file import system module 212, a correction module 213, and a format standardization module 214.

The file import system module 212 receives the raw data 100 from any one of file systems, emails, Content Management Systems and physical document scanning devices. The file import system module 212 also detects potential contracts and checks if any duplicates of documents exist in the discovery database 160 already. In addition, the file import system module 212 can convert a physical document into another electronic format, for example Portable Document Format (PDF), Microsoft Office format, Tagged Image File Format (TIFF), Graphics Interchange Format (GIF), Join Photographic Experts Group (JPEG) and etc. Moreover, the file import system module 212 may include an image file processor module with an optical character recognition (OCR) engine 218. The OCR engine 218 may be an ABBYY fine reader engine or a standard iFilter OCR engine. It is to be noted that other types of OCR engine or any combinations of OCR engine may be implemented. Furthermore, the file import system module 212 detects the language of the contractual document and how many words exist within. In one aspect, the OCR engine 218 of the file import system module 212 determines a quality of the OCR performed for each character or each word, and generates a quality score indicating a quality of the OCR performed for each character or each word.

The correction module 213 in the input processor 110 receives the data imported from the file import system module 212. The correction module 213 also is configured to apply typographical corrections or OCR corrections.

In an exemplary embodiment, the format standardization module 214 tailors the format of the data imported from the file import system module 212 for further processing. The format standardization module 214 applies filters to extract textual information. In addition, the input processor 110 may remove passwords to access a protected contractual document only when the owners of the documents agree to remove such passwords. Furthermore, the format standardization module 214 includes a file protection function that creates copies of potential contractual documents identified. These identified contractual documents are stored in the discovery database 160 with security access attributes.

Figure 3:
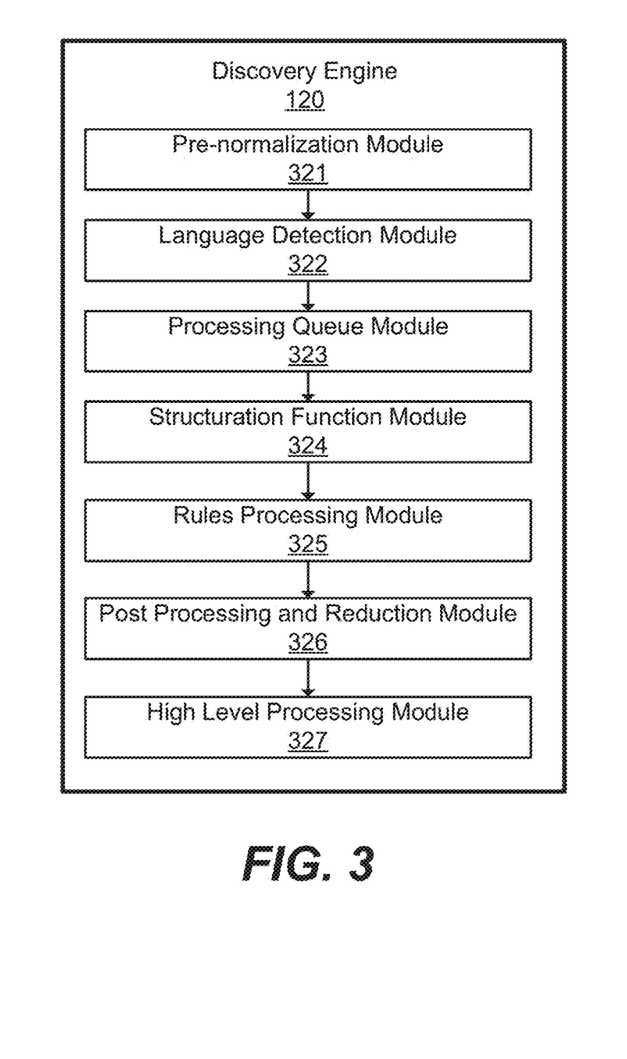
FIG. 3 illustrates a discovery engine of the standard exact clause detection system to properly structure and to normalize the input data.

Next, FIG. 3 illustrates an embodiment of the discovery engine 120 that structurally analyzes an input data from the input processor 110 and generates the predefined policy. The predefined policy includes, but not limited to, predefined rules, predefined features, and predefined clause examples.

The discovery engine 120 also applies the predefined policy into the search engine (not shown) and prepares initial search results along with the predefined policy and metadata in a format that allows the end user to view. As shown in FIG. 3, the discovery engine 120 includes a pre-normalization module 321, a language detection module 322, a processing queue module 323, a structuration function module 324, a rules processing module 325, a post processing and reduction module 326, and a high level processing module 327.

The pre-normalization module 321 receives the imported data in the standardized format obtained from the input processor 110, and converts the imported data into the standard XML or HyperText Markup Language (HTML) document. Also, the language detection module 322 can identify the language used in the XML or HTML converted document (e.g., English, German, and etc.), and place the document in the processing queue module 323.

Figure 4:
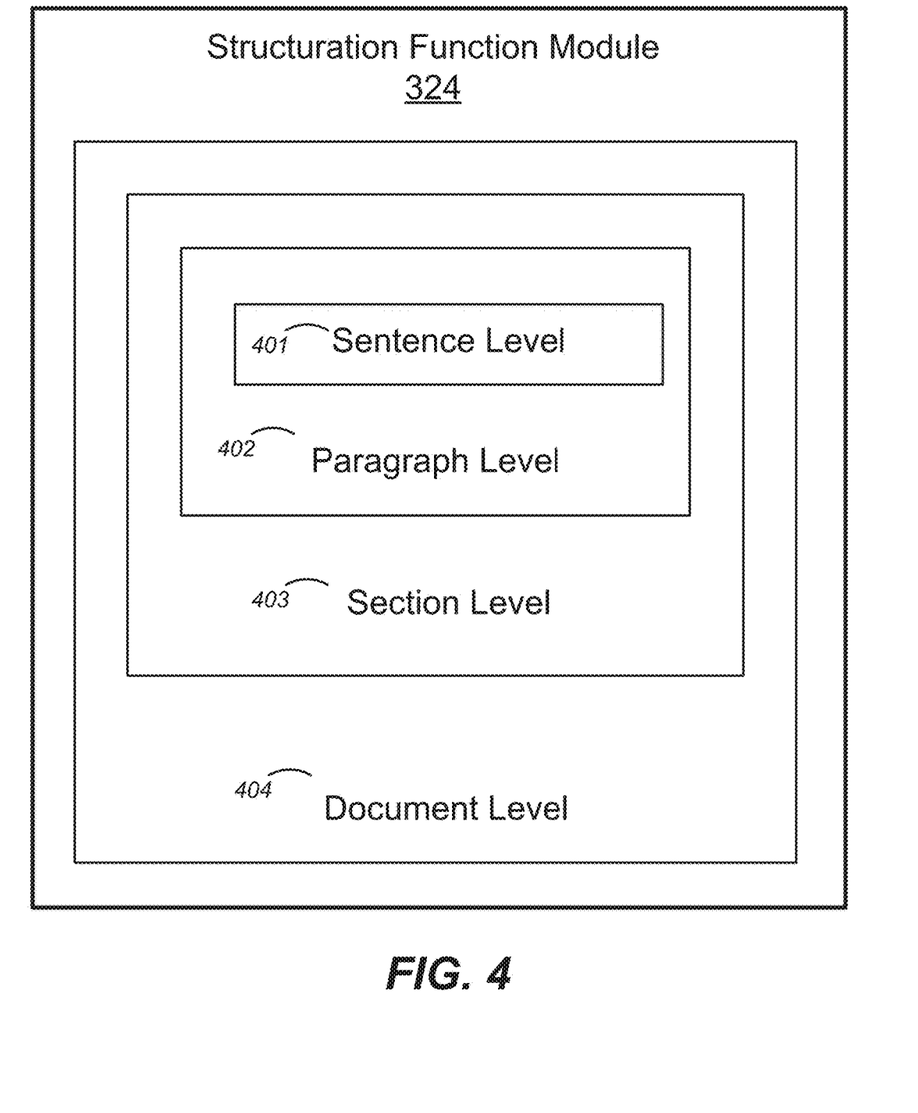
FIG. 4 illustrates a representation of data stored as discreet database documents with different indexes.

Once the XML or HTML converted document is out of the processing queue module 323, the structuration function module 324 structurally analyzes the XML or HTML converted document into a plurality of hierarchical levels. In FIG. 4, illustrated is a representation of data stored as discreet database documents: a sentence level 401, a paragraph level 402, a section level 403, and a document level 404. Analyzing the documents or data in the structure mentioned above allows locating of terminologies and clauses used in the contractual documents.

Referring back to FIG. 3, following the structuration function module 324 is the rules processing module 325. In this stage, the discovery engine 120 applies the predefined rules to generate the predefined features. The predefined rules determine the logic or sequence of words, sentences, phrases, NLP (natural language processing) features, or terminologies. In addition, the rules processing module 325 generates the predefined features from the predefined rules for the end user to customize in the analysis engine 130. The predefined features can be a key reference or a descriptive verb that can describe the document and the information held within. For instance, the predefined features can be a start date, a termination date, a contract type, and etc.

In addition, the post processing and reduction module 326 reduces and normalizes the predefined features from the rules processing module 325. It is to be noted that in addition to sentence and paragraph boundaries, the discovery engine 120 can identify contractual section boundaries such as termination, limitation of liability, indemnity sections of a contract, and etc. Moreover, the post processing and reduction module 326 prepares the predefined features for the end user to customize in the analysis engine 130.

Normalization in the post processing and reduction module 326 reduces the common notations into a standard format. For instance, the same date can be expressed in multiple ways (e.g. Oct. 23, 1992, Oct. 23, 1992, 10/23/1992, 23/10/1992, 1992/10/23 and etc.), and the normalization can convert various formats into standard ISO format. Normalizing to the standard format can eliminate confusions and improve processing speed. Most importantly, by consolidating into same notations, the discovery engine 120 can reduce any duplicate terms in different formats.

After the feature creation and normalization, the high level processing module 327 creates metadata and stores them in the discovery database 160. Additionally, the search engine communicatively coupled to the discovery database 160 obtains initial search results to determine the eligibility for analytics processing. Moreover, the high level processing module 327 prepares the predefined policy as well as the initial search results in a format that the end user can view. Furthermore, either one or both of an internal search engine and an external search engine may perform a search function.

Figure 5:
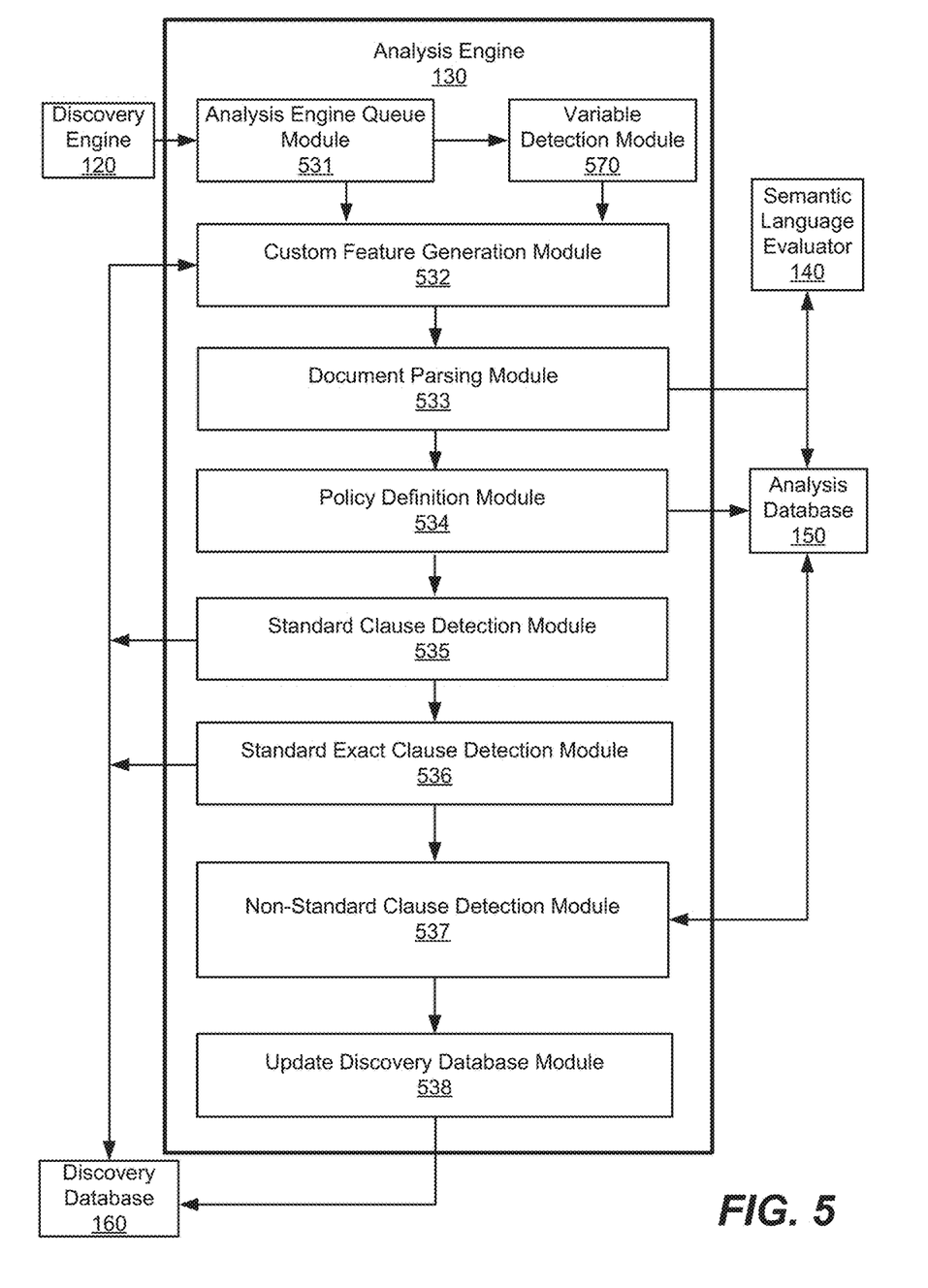
FIG. 5 illustrates an analysis engine of the standard exact clause detection system to define standard exact clauses in contractual documents.

Referring now to FIG. 5, illustrated is one embodiment of the analysis engine 130, which identifies standard exact clauses, standard clauses, and non-standard clauses. As illustrated, the analysis engine 130 includes an analysis engine queue module 531, a variable detection module 570, a custom feature generation module 532, a document parsing module 533, a policy definition module 534, a standard clause detection module 535, a standard exact clause detection module 536, a non-standard clause detection module 537, and an update discovery database module 538.

The discovery engine 120 transfers a data set including the predefined policy, search indexes, and the initial search results to the analysis engine queue module 531. Following the analysis engine queue module 531, the custom feature generation module 532 allows the end user to customize the predefined features obtained from the discovery engine 120 and to define primary features.

The variable detection module 570 receives search indexes or the initial search results and provides available variations of clauses to the custom feature generation module 532. The variable detection module 570 may receive the search indexes or the initial search results from the discovery engine 120 directly or from the analysis engine queue module 531. The variable detection module 570 may detect allowable variations of clauses according to examples stored in the discovery engine 120 and provide the detected allowable variations of clauses with associated variables to the custom feature generation module 532.

The custom feature generation module 532 receives the predefined features from the analysis engine queue module 531 to define primary features to be used in semantic language evaluation. The custom feature generation module 532 may also receive detected allowable variations from the variable detection module 570 to define the primary features. In one approach, the custom feature generation module 532 presents to a user a list of clauses or features within a template. The user may select which clauses are to be considered as standard clauses. In addition, the user may select which clauses or words in the standard clauses can be varied. In one approach, the user may assign a variable to each set of selected clauses or words allowed to be varied. Alternatively, the custom feature generation module 532 may assign a variable to a set of clauses or words allowed to be changed. The custom feature generation module 532 provides the primary features comprising selected clauses examples and variables associated with allowable variations to a document parsing module 533.

Following is an example passage of a document with clause examples replaced with associated variables.

EXAMPLE 1

"absText": "WatchtowerNumber. Code of Conduct. WatchtowerParty Descriptors acknowledges the terms of WatchtowerLocation WatchtowerPartyDescriptors Code of Business Conduct\nand Ethics WatchtowerPartySubjectVerb WatchtowerPartyDescriptors (i) that ail of WatchtowerPartyDescriptors dealings with WatchtowerPartyDescriptors WatchtowerLocation, whether pursuant to\nthis Agreement or otherwise, shall be in general alignment with the requirements of the Code, and (ii)\nnot to induce or otherwise cause any WatchtowerPartyDescriptors WatchtowerLocation associate to violate the Code, with Code Number WatchtowerNumber. Should this be violated, the WatchtowerContractingParties agree to pay WatchtowerSealMoney within WatchtowerDuration.\n", "offsetStart": 12704, "offsetEnd": 13085.

In the example passage above, various clauses are replaced with corresponding variables. Specifically, variations of a contract number, a party involved in the contract, another party involved in the contract, a specific location, a specific act, amount and duration can be replaced with a variable "WatchtowerNumber," "WatchtowerPartyDescriptors," "WatchtowerContractingParties," "WatchtowerLocation," "WatchtowerPartySubjectVerb," "WatchtowerSealMoney," and "WatchtowerDuration" respectively.

With the user defined primary features, the document parsing module 533 replaces the actual text, phrases or clauses with the primary features. In one embodiment, the document parsing module 533 replaces words or clauses with allowed variations with corresponding variables. The semantic language evaluator 140 formed with the primary features replaced data set, ensures the accuracy and quality of the data. That is, the semantic language evaluator 140 accounts for minor anomalies within the clauses, allowing the analysis engine 130 to locate and group clauses based on the core semantics. The document parsing module 533 transfers clause examples to the semantic language evaluator 140, and the semantic language evaluator assesses the similarity to each of the examples. In one exemplary embodiment, the semantic language evaluator 140 may be a Latent Symantec Index (LSI) module, which may provide a cosine vector score based on the similarity and classify clauses accordingly. For instance, a cosine vector score of 1 indicates a high degree of similarity, when 0 indicates a low degree of similarity.

The policy definition module 534 allows the end user to define the primary policy that includes primary rules, primary features or clause examples (herein also referred to as "primary clause examples") and a first threshold. In one exemplary embodiment, a recommended value for the first threshold is '95' or between '90' and '99,' when the semantic language evaluator is the LSI module.

The standard clause detection module 535 obtains standard clauses based on the primary policy. In one implementation, the standard clause detection module 535 applies the primary policy with the first threshold to the semantic language evaluator 140 to obtain the standard clauses. The primary policy with the first threshold allows the analysis engine 130 to locate clauses that are almost identical to the primary clause examples. The standard clause detection module 535 may provide a standard feature data set comprising the standard clauses to the custom feature generation module 532. The custom feature generation module 532 may modify clause examples based on the standard clauses or present the standard clauses detected to a user to allow a list of clause examples or allowable variations of clauses to be re-selected. The standard clause detection module 535 may also store the standard feature data set in the discovery database 160.

The standard exact clause detection module 536 obtains the standard exact feature data set comprising standard exact clauses based on the clause examples. In one embodiment, the standard exact clause detection module 536 replaces words or clauses allowed to be changed with corresponding variables instead of the document parsing module 533. The standard exact clause detection module 536 compares each word and an order of words from a document with each word and an order of words from clause examples to obtain standard exact clauses exactly matching the clause examples. The textual matching is performed word by word, and in this example a word can be seen as a token. A token can be made from any contiguous textual items, numbers, text, symbols. Each token is compared against the clause examples provided within the primary policy, in the exact word order it is within the clause, with the system rejecting an item as soon as the first Token is found to not match. In one implementation, the LSI module may not consider an order of the words, thus the standard exact clause detection module 536 obtains N-Gram of different words or tokens to compare an order of words. By replacing words or clauses allowed to be changed with their corresponding variables, the standard exact clause detection module 536 can reduce a number of comparisons performed to identify standard exact clauses while taking into account for each variation of clause examples.

In one embodiment, the standard exact clause detection module 536 also identifies a candidate standard exact clause including an obscure word (or a character of the word) with poor optical character recognition based on the quality score provided from the OCR engine 218. Responsive to determining the quality of the OCR performed on the obscure word is poor (e.g., the quality score of the obscure word is below a quality threshold value), the standard exact clause detection module 536 determines whether qualities of the OCR performed on a preceding word and a succeeding word of the obscure word are acceptable. If the qualities of the OCR performed on the preceding word and the succeeding word are acceptable, the standard exact clause detection module 536 determines whether any of the clause examples and the variables include the preceding word, a candidate word, and the succeeding word in that sequence. If a clause example including the preceding word, the candidate word, and the succeeding word in that sequence is found, a clause including the preceding word, the obscure word, and the succeeding word is determined to be a candidate standard exact clause. The standard exact clause detection module 536 may add the candidate standard exact clause to the standard exact feature data set.

The standard exact clause detection module 536 may provide the standard exact feature data set to the custom feature generation module 532. The custom feature generation module 532 may modify clause examples based on the standard exact clauses or candidate standard exact clauses. The custom feature generation module 532 may also present the standard exact clauses (or candidate standard exact clauses) detected to a user to allow a list of clause examples or allowable variations of clauses to be re-selected. The standard exact clause detection module 536 may also store the standard exact feature data set in the discovery database 160.

The non-standard clause detection module 537 may create a secondary policy, which is a copy of the primary policy that does not contain any rules, but includes a second threshold lower than the first threshold. In one exemplary embodiment, a recommended value for the second threshold is '60' or between '50' and '70', when the semantic language evaluator 140 is the LSI module. In addition, the non-standard clause detection module 537 extracts a mirror feature data set with the secondary policy. The secondary policy allows the analysis engine 130 to locate all clauses that are semantically similar to the primary search examples. It is to be noted that, not only the mirror feature data set contains more data, but also contains exact match from the standard feature data set. That is, the mirror feature data set encompasses the standard feature data set, where the standard feature data set encompasses the standard exact feature data set.

In one embodiment, the non-standard clause detection module 537 subtracts the standard exact feature data set from the mirror feature data set to obtain the non-standard clauses. In this embodiment, standard clauses that are not standard exact clauses would be identified as non-standard clauses.

In another embodiment, the non-standard clause detection module 537 subtracts the standard feature data set from the mirror feature data set to obtain the non-standard clauses. In this embodiment, the non-standard clause detection module 537 may obtain the non-standard clauses after the standard clauses are obtained in the standard clause detection module 535 but before the standard exact clauses are obtained in the standard exact clause detection module 536. Alternatively, the non-standard clause detection module 537 can obtain the non-standard clauses after the standard exact clauses are obtained in the standard exact clause detection module 536.

Once the analysis engine 130 obtains the standard clauses, standard exact clauses and non-standard clauses, the update discovery database module 538 may update the discovery database 160 with the standard clauses, standard exact clauses and the non-standard clauses obtained.

Standard Exact Clause and Non-Standard Clause Detection Process

Figure 6:
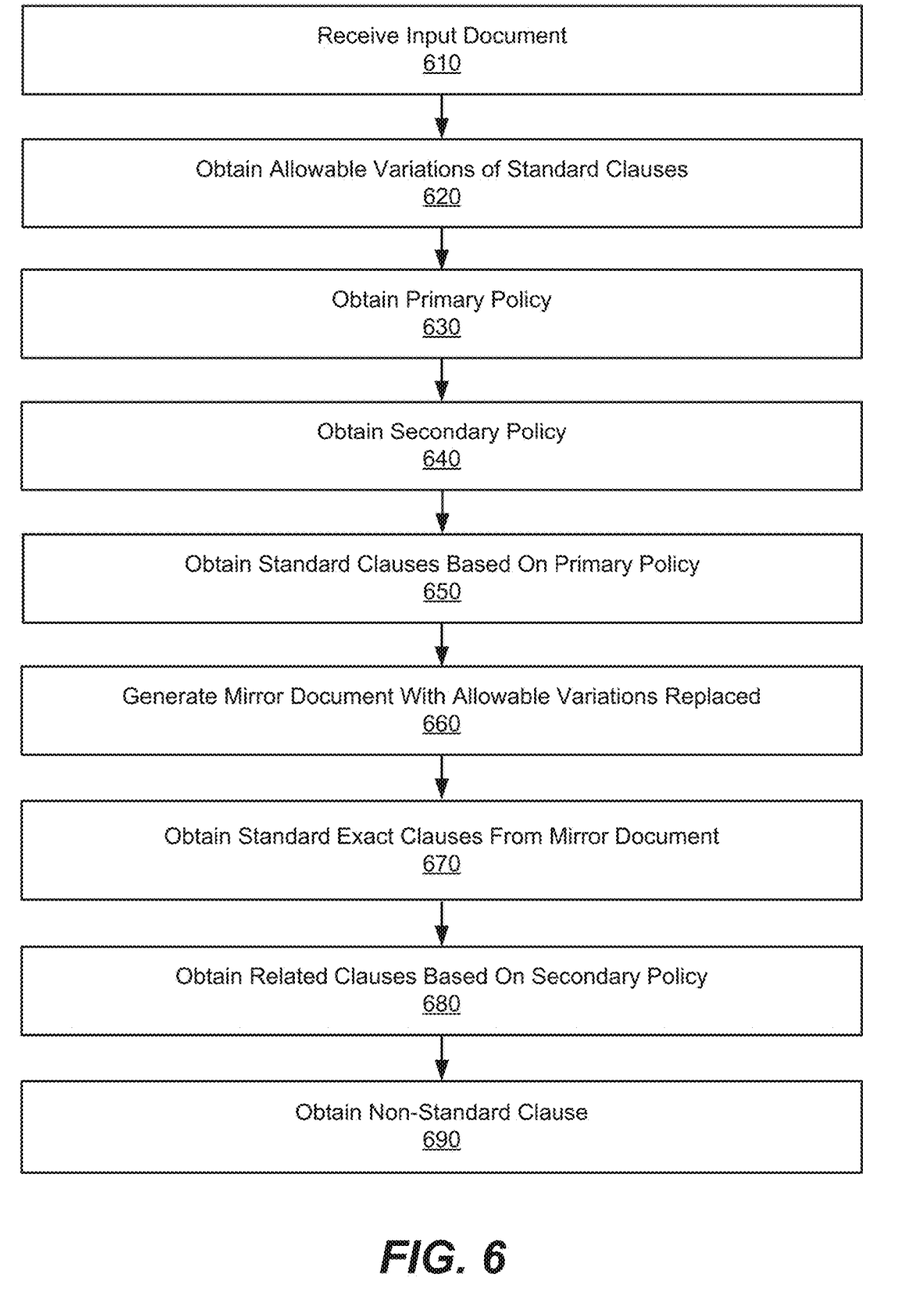
FIG. 6 illustrates a flow chart of a method of obtaining standard exact clauses and non-standard clauses.

FIG. 6 illustrates a process of obtaining standard exact clauses and non-standard clauses. The process may be performed by the variable detection module 570, policy definition module 534, standard clause detection module 535, standard exact clause detection module, 536, non-standard clause detection module 537 of the analysis engine 130. In other embodiments, the steps of FIG. 6 may be performed by different or additional components. Other embodiments can perform the steps of FIG. 6 in different orders. Moreover, other embodiments can include different and/or additional steps than the ones described here.

The variable detection module 570 receives an input document 610. The variable detection module 570 obtains 620 allowable variations of standard clauses and a corresponding variable for the variations. The policy definition module 534 obtains 630 the primary policy including the primary rules, the primary features, the primary clause examples and the first threshold for determining similarities. The policy definition module 534 obtains 640 the secondary policy which is a copy of the primary policy that does not contain any rules but includes a second threshold lower than the first threshold. In one embodiment, the primary policy, the secondary policy and the allowable variations of standard clauses may be obtained in different orders.

The standard clause detection module 535 obtains 650 a standard feature data set comprising standard clauses based on primary policy from the input document. The standard exact clause detection module 536 generates 660 a mirror document by replacing allowable variations with corresponding variables, and obtains 670 a standard exact feature data set comprising standard exact clauses exactly matching the clause examples from the mirror document. Moreover, the non-standard clause detection module obtains 680 mirror feature data set comprising related clauses based on secondary policy from the input document. Furthermore, the non-standard clause detection module 537 obtains 690 a difference between the mirror feature data set and the standard exact feature data set to obtain non-standard clauses.

Policy Definition Process

Figure 7:
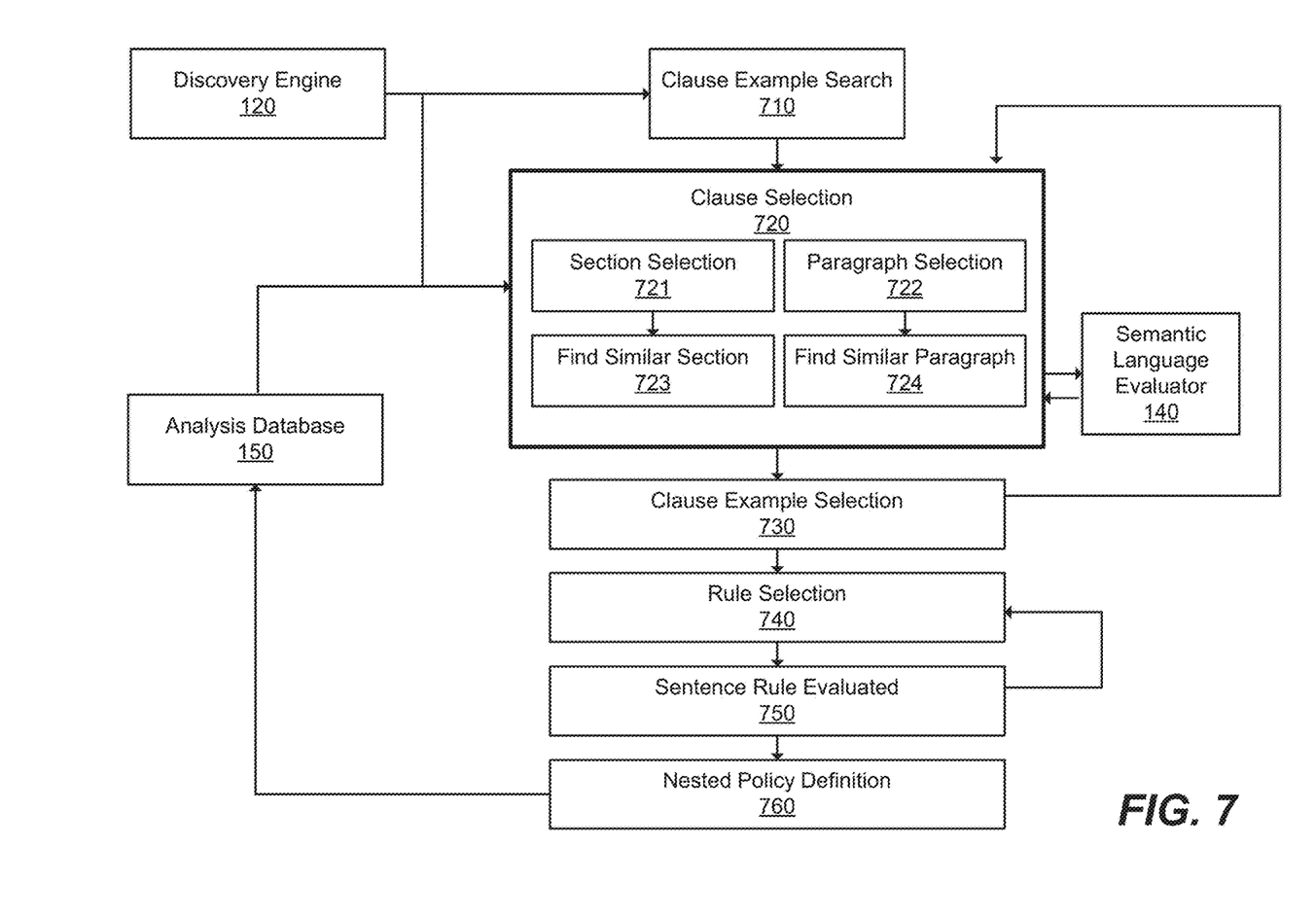
FIG. 7 illustrates a process for determining a policy to specify clauses for extraction.

FIG. 7 illustrates an example process of determining the policy. The primary policy provides guidance on how and where to look for contract specific terminologies. Again, the primary policy may include the primary rules, the primary features, the primary clause examples and the first threshold for determining similarities. Other embodiments can perform the steps of FIG. 7 in different orders. The steps of FIG. 7 may be performed by custom feature generation module 532, document parsing module 533, and policy definition module 534 of the analysis engine 130. In other embodiments, the steps of FIG. 7 may be performed by different or additional components (e.g., variable detection module 570). Moreover, other embodiments can include different and/or additional steps than the ones described here.

In this example, the discovery engine 120 provides a discovery search index to the analysis engine 130 to perform a clause example search 710, and presents the predefined clause examples to the end user. The end user may search for the primary clause examples in the clause selection 720, either under a section or a paragraph. If the end user decides to look for a clause under the section, the custom feature generation module 532 loads the feature replaced data in the section selection 721. In a find similar section 723, the document parsing module 533 requests the semantic language evaluator 140 to query if similar features exist already within the index. Likewise, if the end user decides to look for a clause under the paragraph, the custom feature generation module 532 loads the feature replaced data from the analysis database 150 in a paragraph selection 722. In a find similar paragraph 724, document parsing module 533 requests the semantic language evaluator 140 to query if similar features exist already within the index.

The policy definition module 534 enables the end user to select the primary clause examples from the search results in a clause example selection 730. Additionally, the end user may repeat the clause selection 720, and select new clauses.

Following the clause example selection 730, the policy definition module 534 enables the end user to select the primary rules to determine the logic or sequence of words, sentences, phrases, or terminologies to be searched in a rule selection 740, and to evaluate the selected rule in a sentence rule evaluated 750. In addition, the end user may repeat the clause selection 720 to select new clauses to be applied or repeat the rule selection 740 to modify selected rules or add additional rules. The policy definition module 534 updates the primary policy as well as the analysis database 150 in the nested policy definition 760.

In embodiment, the secondary policy may be generated based on the primary policy, or through the similar steps described above.

Data Storage Method

Referring back to FIG. 4, illustrated is a representation of data stored as discreet database documents. To enable the detection of the standard exact clauses and non-standard clauses, each data set associated with a clause that may contain a unique identification number or following indexes: a sentence level 401, a paragraph level 402, a section level 403, and a document level 404. In addition to the identification number, each data set may include actual text or features replaced for the clause, and the position of the clause.

During the process of defining policies and determining the non-standard and standard exact clauses, the discovery engine 120 and the analysis engine 130 communicates frequently with the discovery database 160 and the analysis database 150 for core processing repository and metadata storage location. In one exemplary embodiment, both databases contain information related to policies and the analysis database 150 may reside in the same hardware with the discovery database 160. However, the data structures in the analysis database 150 provide for two differing data sets for each sentence, paragraph, and section: one for exact text and another for features. Therefore, the storage requirement of the analysis database 150 may be demanding, but the analysis engine 130 can achieve advanced functionality including feature replacements. To reduce the extra storage requirement, the analysis database 150 may use a pointer, instead of creating copies of the entire data set.

Computing Machine Architecture

Figure 8:
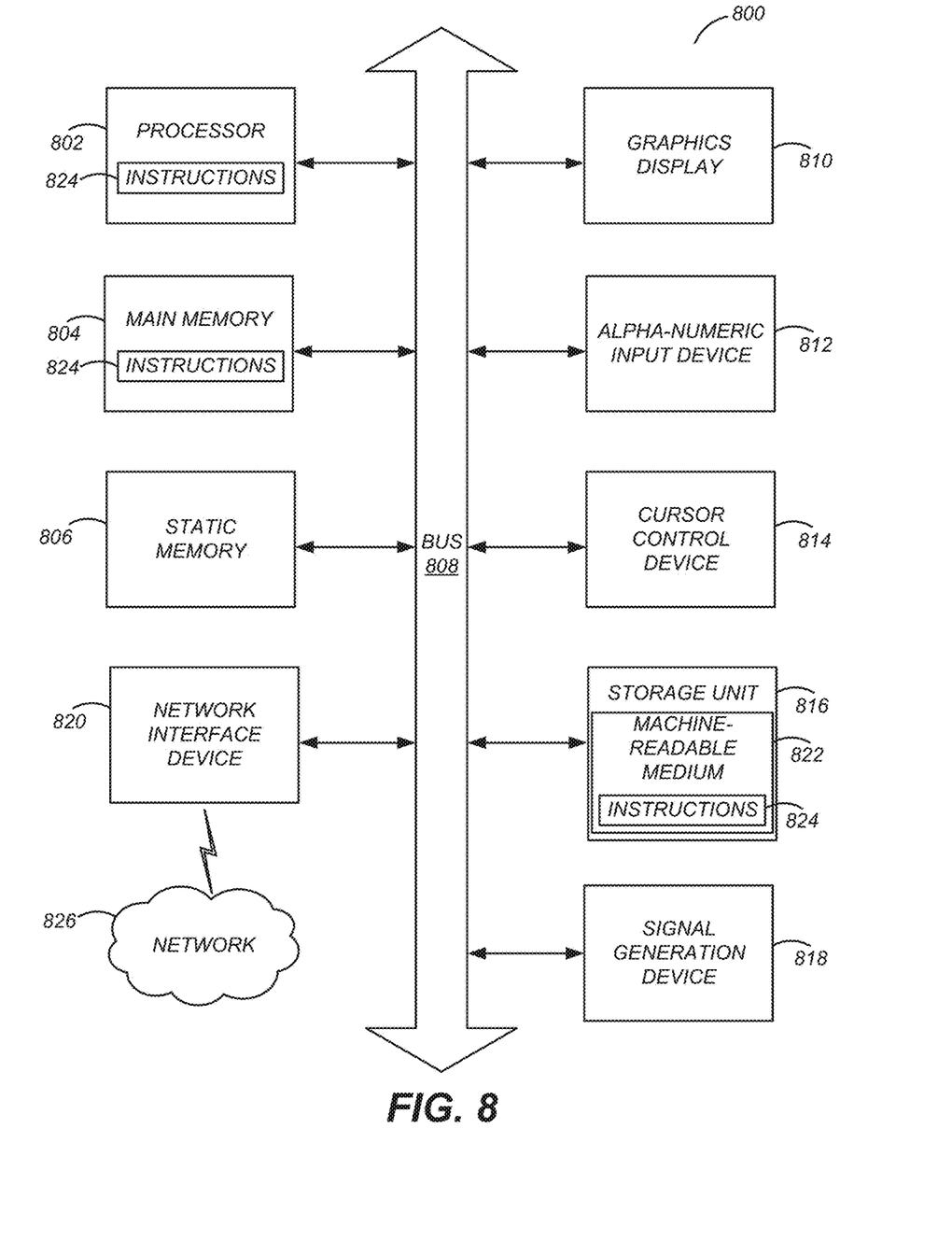
FIG. 8 illustrates components of an example machine able to read instructions from a machine-readable medium and execute them in a processor (or controller).

Turning now to FIG. 8, it is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software or program code) for causing the machine to perform (execute) any one or more of the methodologies described with FIGS. 1-7. That is, the methodologies illustrated and described through FIGS. 1-7 can be embodied as instructions 824 that are stored and executable by the computer system 800. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The processing components are the processor 802 and memory 804. These components can be configured to operate the engines or modules with the instructions that correspond with the functionality of the respective engines or modules. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The storage unit 816 may be implemented as volatile memory (static RAM (SRAM) or dynamic RAM (DRAM)) and/or non-volatile memory (read-only memory (ROM), flash memory, magnetic computer storage devices (e.g., hard disks, floppy discs and magnetic tape), optical discs and etc.). The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of contracts, the principles disclosed can apply to analysis of other documents that can include data corresponding to standard exact clauses and non-standard clauses. Advantages of the disclosed configurations include promptly identifying (i) exact clauses, (ii) semantically related terminologies and (iii) unusual variations of the semantically related terminologies in a large volume of documents. Moreover, while the examples herein are in the context of a contract document, the principles described herein can apply to other documents, for example web pages, having various clauses.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, engines, modules, or mechanisms, for example, as illustrated in FIGS. 1-7. Modules may constitute either software modules (e.g., program code embodied as instructions 824 stored on a machine-readable medium e.g., memory 804 and/or storage unit 816, and executable by one or more processors (e.g., processor 802)) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors (generally, e.g., processor 802)) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 804). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting standard exact clauses and non-standard clauses through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium storing program code for determining a presence of a type of clause within a plurality of documents, the program code comprising instructions that when executed by a processor cause the processor to:

receive a clause example corresponding to the type of clause;

generate a primary policy based upon the received clause example for use in a semantic language evaluator configured to assess a level of semantic similarity between received clauses, the primary policy comprising one or more policy rules and associated with a first threshold value indicating a level of semantic similarity of a clause to the clause example;

analyze, using the semantic language evaluator, the plurality of documents according to the primary policy to automatically provide a first set of clauses corresponding of the plurality of documents, each clause of the first set corresponding to a standard clause matching the clause example;

generate a mirror document based upon the plurality of documents by automatically replacing one or more portions of the plurality of documents having allowable variations with corresponding variables;

parse the mirror document to generate a second set of clauses corresponding to a standard exact feature data set;

generate a secondary policy based upon the primary policy and the clause example for use in the semantic language evaluator, the secondary policy associated with a second threshold value indicating a level of semantic similarity of a clause to the clause example that is lower than the first threshold value;

analyze, using the semantic language evaluator, the plurality of documents according to the secondary policy to automatically provide a third set of clauses comprising non-standard clauses semantically related to but not matching the clause example, wherein the third set of clauses corresponds to a mirror feature data set;

obtain a difference between the mirror feature data set and the standard exact feature data set, the difference corresponding to non-standard clauses of the plurality of documents;

update, automatically, a database to identify the standard and non-standard clauses of the plurality of documents associated with the type of clause based upon the obtained difference, for subsequent usage in analyzing the plurality of documents.

2. The non-transitory computer readable medium of claim 1, further comprising instructions when executed by the processor cause the processor to:

receive one or more features associated with the type of clause; and generate, using a semantic language evaluator, a plurality of feature replaced clauses by automatically replacing one or more of a plurality of original clauses in the plurality of documents with the one or more features.

3. The non-transitory computer readable medium of claim 1, further comprising instructions when executed by the processor cause the processor to:
   identify a portion of the clause example as corresponding to an available variation of the clause example; and
   replace the available variation with a variable.

4. The non-transitory computer readable medium of claim 3, further comprising instructions when executed by the processor cause the processor to:
   parse the plurality of documents to generate the second set of clauses corresponding to the standard exact feature data set containing clauses matching the clause example based upon the available variation.

5. The non-transitory computer readable medium of claim 1, further comprising instructions when executed by the processor cause the processor to:
   replace one or more clauses of the plurality of documents with one or more features, each feature of the one or more features corresponding to a reference or description of a portion of the plurality of documents,
   wherein the first policy is generated based upon at least one feature of the one or more features.

6. The non-transitory computer readable medium of claim 1, further comprising instructions when executed by the processor cause the processor to:
   obtain a difference between the first set of clauses and the third set of clauses corresponding to one or more non-standard clauses.

7. A computer implemented method for determining a presence of a type of clause within a plurality of documents, the method comprising:
   receiving a clause example corresponding to the type of clause;
   generating a primary policy based upon the received clause example for use in a semantic language evaluator configured to assess a level of semantic similarity between received clauses, the primary policy comprising one or more policy rules and associated with a first threshold value-indicating a level of semantic similarity of a clause to the clause example;
   analyzing, using the semantic language evaluator, the plurality of documents according to the primary policy to automatically provide a first set of clauses corresponding of the plurality of documents, each clause of the first set corresponding to a standard clause matching the clause example;
   generating a mirror document based upon the plurality of documents by automatically replacing one or more portions of the plurality of documents having allowable variations with corresponding variables;
   parsing the minor document to generate a second set of clauses corresponding to a standard exact feature data set;
   generating a secondary policy based upon the primary policy and the clause example for use in the semantic language evaluator, the secondary policy associated with a second threshold value indicating a level of semantic similarity of a clause to the clause example that is lower than the first threshold value;
   analyzing, using the semantic language evaluator, the plurality of documents according to the secondary policy to automatically provide a third set of clauses comprising non-standard clauses semantically related to but not matching the clause example, wherein the third set of clauses corresponds to a mirror feature data set;
   obtaining a difference between the mirror feature data set and the standard exact feature data set, the difference corresponding to non-standard clauses of the plurality of documents; and
   automatically updating a database to identify the standard and non-standard clauses of the plurality of documents associated with the type of clause based upon the obtained difference, for subsequent usage in analyzing the plurality of documents.

8. The method of claim 7, further comprising:
   receiving one or more features associated with the type of clause; and
   generating, using a semantic language evaluator, a plurality of feature replaced clauses by automatically replacing one or more of a plurality of original clauses in the plurality of documents with the one or more features.

9. The method of claim 7, further comprising:
   identifying a portion of the clause example as corresponding to an available variation of the clause example; and
   replacing the available variation with a variable.

10. The method of claim 9, further comprising:
    parsing the plurality of documents to generate the second set of clauses corresponding to the standard exact feature data set containing clauses matching the clause example based upon the available variation.

11. The method of claim 7, further comprising:
    replacing one or more clauses of the plurality of documents with one or more features, each feature of the one or more features corresponding to a reference or description of a portion of the plurality of documents,
    wherein the first policy is generated based upon at least one feature of the one or more features.

12. The method of claim 7, further comprising:
    obtain a difference between the first set of clauses and the third set of clauses corresponding to one or more non-standard clauses.

13. A system for determining a presence of a type of clause within a plurality of documents, comprising:
    a document parsing module configured to receive a clause example corresponding to the type of clause;
    a policy definition module configured to:
      generate a primary policy based upon the received clause example for use in a semantic language evaluator configured to assess a level of semantic similarity between received clauses, the primary policy comprising one or more policy rules and associated with a first threshold value indicating a level of semantic similarity of a clause to the clause example; and
      generate a secondary policy based upon the primary policy and the clause example for use in the semantic language evaluator, the secondary policy associated with a second threshold value indicating a level of semantic similarity of a clause to the clause example that is lower than the first threshold value;
    an analysis engine configured to:
      analyze, using the semantic language evaluator, the plurality of documents according to the primary policy to automatically provide a first set of clauses corresponding of the plurality of documents, each clause of the first set corresponding to a standard clause matching the clause example;
      generate a mirror document based upon the plurality of documents by automatically replacing one or more portions of the plurality of documents having allowable variations with corresponding variables;

parse the mirror document to generate a second set of clauses corresponding to a standard exact feature data set;

analyze, using the semantic language evaluator, the plurality of documents according to the secondary policy to automatically provide a third set of clauses comprising non-standard clauses semantically related to but not matching the clause example, wherein the third set of clauses corresponds to a minor feature data set;

obtain a difference between the mirror feature data set and the standard exact feature data set, the difference corresponding to non-standard clauses of the plurality of documents; and update, automatically, a database to identify the standard and non-standard clauses of the plurality of documents associated with the type of clause based upon the obtained difference, for subsequent usage in analyzing the plurality of documents.

14. The system of claim 13, wherein the document parsing module is further configured to:

receive one or more features associated with the type of clause; and generate, using a semantic language evaluator, a plurality of feature replaced clauses by automatically replacing one or more of a plurality of original clauses in the plurality of documents with the one or more features.

15. The system of claim 13, wherein the document parsing module is further configured to:

identify a portion of the clause example as corresponding to an available variation of the clause example; and replace the available variation with a variable.

16. The system of claim 15, wherein the analysis engine is further configured to:

parse the plurality of documents to generate the second set of clauses corresponding to the standard exact feature data set containing clauses matching the clause example based upon the available variation.

17. The system of claim 13, wherein the document parsing module is further configured to:

replace one or more clauses of the plurality of documents with one or more features, each feature of the one or more features corresponding to a reference or description of a portion of the plurality of documents, and wherein the policy definition module is configured to generate the first policy based upon at least one feature of the one or more features.

18. The system of claim 13, wherein the analysis engine is further configured to:

obtain a difference between the first set of clauses and the third set of clauses corresponding to one or more non-standard clauses.

* * * * *